E. S. HUTTON.
GLASS DISCHARGING MECHANISM.
APPLICATION FILED MAR. 26, 1920.
1,391,957.
Patented Sept. 27, 1921.
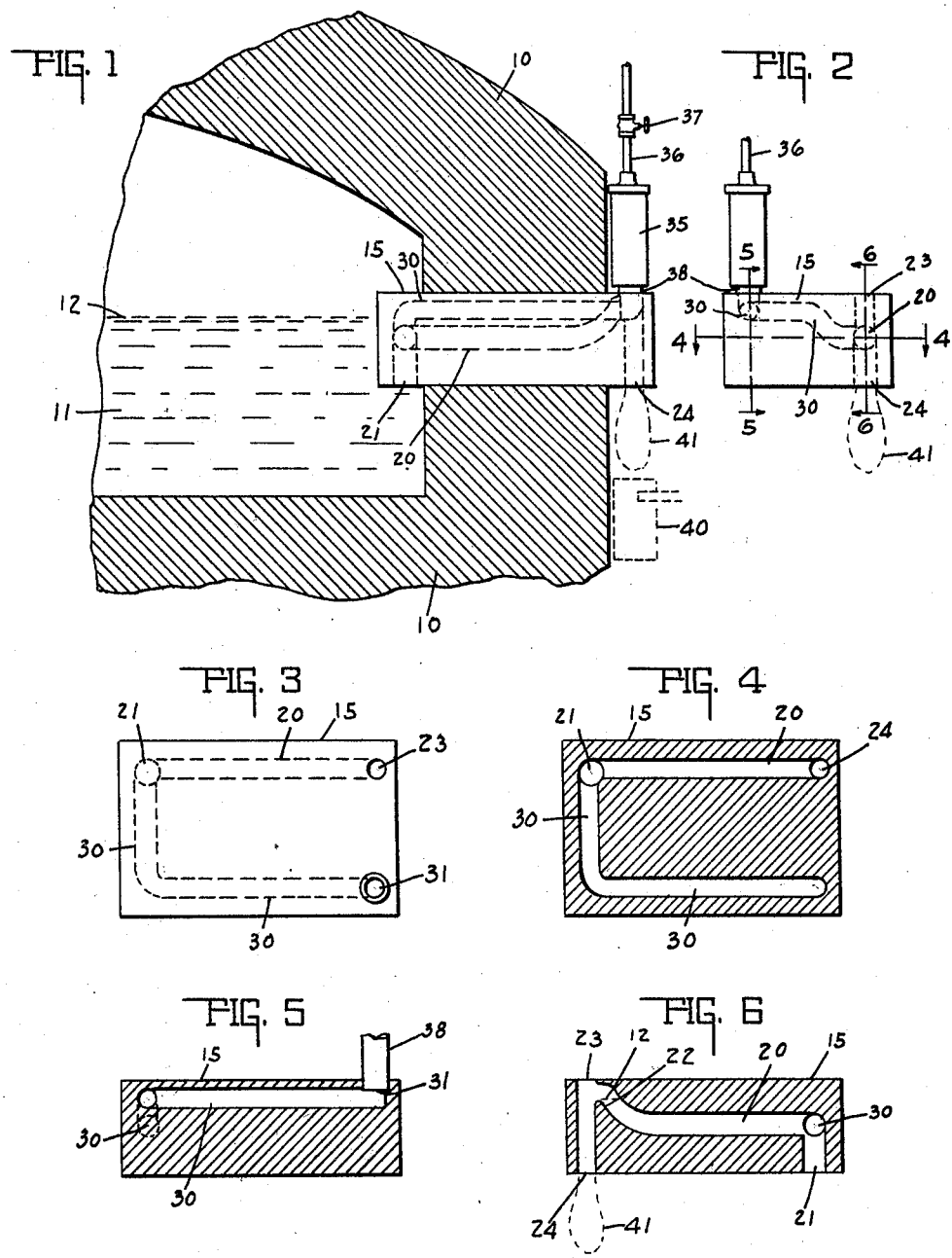
INVENTOR
EDWARD S. HUTTON.
BY
Lockwood Lockwood
ATTORNEYS.

ID

UNITED STATES PATENT OFFICE.

EDWARD S. HUTTON, OF LAPEL, INDIANA.

GLASS-DISCHARGING MECHANISM.

1,391,957.   Specification of Letters Patent.   Patented Sept. 27, 1921.

Application filed March 26, 1920. Serial No. 368,867.

*To all whom it may concern:*

Be it known that I, EDWARD S. HUTTON, a citizen of the United States, and a resident of Lapel, county of Madison and State of Indiana, have invented a certain new and useful Glass-Discharging Mechanism; and I do hereby declare that the following is a full, clear, and exact description thereof, reference being had to the accompanying drawings, in which like numerals refer to like parts.

This invention relates to a glass discharge apparatus in a glass tank for conveying the molten glass from the interior of the tank and discharging the same in a gather into a mold.

The object of this invention is to provide a simple discharging apparatus which will always function and keep itself automatically cleaned of chilled glass and will avoid the troubles arising from a glass discharge apparatus where the outlet is closed or controlled by a plunger or other stopping means which is liable to become "stuck" by reason of the chilling of the glass, and which requires considerable time and trouble to heat and melt the chilled glass therein after the device has become cold from non-use and preliminary to starting the tank again.

One feature of the invention consists in providing a clay discharge block or member which extends through the wall of the tank and projects beyond the inner surface of the wall for the inlet and beyond the outer surface of the wall for the outlet, said block or member being provided with a conduit that is always open and free from obstruction, other than the molten glass therein. The conduit is so arranged that the molten glass stands therein at a level with the glass in the tank and has a gooseneck outlet with the throat thereof elevated above the normal level of the glass, and means is provided for causing the sudden elevation of the level of the glass in said conduit, whereby the level of the glass in the conduit will rise above the throat of the outlet and discharge a predetermined quantity of glass to constitute the "gather."

Along with the foregoing is the further idea of utilizing air under pressure for elevating the glass in the conduit so as to cause the discharge, and the parts are so arranged that no metal part comes in contact with the glass for controlling it, but it is wholly controlled by the air, whereby there is no chance of the molten glass injuring the apparatus by the high degree of heat thereof and the life of the apparatus is, therefore, prolonged.

The full nature of the invention will be understood from the accompanying drawings and the following description and claims.

In the drawings, Figure 1 is a section through a portion of a glass tank showing the discharge apparatus in side elevation, a gather of glass being indicated by dotted lines. Fig. 2 is an elevation of the outer end of the discharge apparatus opposite to the side shown in Fig. 1. Fig. 3 is a plan view of the discharge member. Fig. 4 is a horizontal section through the discharge member on the line 4—4 of Fig. 2. Fig. 5 is a vertical section on the line 5—5 of Fig. 2 and part of the air supply apparatus attached. Fig. 6 is a vertical section through the line 6—6 of Fig. 2.

There is shown in the drawings herein a glass tank 10 which may be of any construction in which there is a body of molten glass 11, the level of the upper surface of which is indicated by the dotted line 12. The discharge member 15, as herein shown, is a rectangular block of clay or like suitable material which extends through the wall of the tank horizontally, so that the upper part thereof will be above the normal glass level and the major portion below that level. Each end of the member 15 projects several inches beyond the wall.

The discharge member 15 has a glass conduit 20 extending horizontally and longitudinally of the same from end to end thereof, and at its inner end it is turned downwardly to form an inlet 21 which is at the bottom of the inner end of the block or member 15. Said inlet need not be in the bottom of said member, although that is preferable because it will always be located in the highly heated portion of the glass from which it is desired to draw the glass, and it should be sufficiently far from the wall so as not to be affected by any glass adhering to the wall of the tank.

The glass conduit through said member 15 is illustrated best in Fig. 6 where it is shown at its outer end to be, in a sense, the shape of a gooseneck. That is, at its outer end said conduit 20 rises above the throat 22 and extends to the top of the member or block 15 and to the open air at 23, and then extends vertically downward to the outlet or discharge end 24. The throat 22 of the glass conduit is so formed or elevated as to extend slightly above, or at least, in line with the normal level 12 of the glass in the tank, so that under normal conditions the glass will not flow or escape by gravity through the discharge conduit, but can only escape and flow therefrom when the glass in the conduit 20 is forced outward, or so as to raise the level of glass therein above the throat 22.

The discharges of glass from the discharge conduit 20 are effected by air pressure exerted on the glass by the following means. An air conduit 30 extends transversely from the inner end of the horizontal conduit 20 for some distance and then longitudinally to the outer end of the block or member 15 and then extends upward to the air inlet 31. Above said discharge member 15 there is a compressed air cylinder 35 secured to the tank, or in any other way, and is supplied with compressed air through a pipe 36 controlled by a valve 37, or by any other suitable means. A projecting pipe 38 extends into the member 15 for a slight distance so as to communicate with the air inlet 31 and supply air thereto. The pipe 38 extends only a slight distance into said member 15, so that it is always above the glass level and never comes in contact with the heated glass. Beneath the discharge outlet 24 there is a mold 40 to receive the gather of glass 41 as it comes from the discharge mechanism of the tank.

The end of the conduit 30 next to the air inlet is higher than the end next to the conduit 20.

The operation of the mechanism is as follows: Assuming that the glass stands in the tank on a level with the dotted line 12, before the apparatus starts, glass will fill the conduit 20 and the lower part of the conduit 30 in the member 15 and stand up to the top of the throat 22 in the conduit 20 and to an equal level in the air conduit 30. By opening the valve 37 of the air apparatus slightly, air enters the air conduit 30 and causes the glass in the lower part of the conduit 30 to move and force the glass in the discharge end of the glass conduit 20 to rise to a higher level than the throat 22 and overflow and discharge through the outlet 24 into the mold. The compressed air is turned only instantaneously or long enough to permit the discharge of the desired gather of glass. By controlling the operation of the air supply, the amount of the gather of glass can be predetermined to suit the mold or purpose for which the glass is discharged.

The invention claimed is:

1. Discharge means for a glass tank, including a discharge member adapted to extend through the wall of the glass tank and beyond the inner and outer surfaces thereof, and having a glass conduit leading from the bottom of the inner end of said member upwardly and thence horizontally to the outer end of said member and thence upwardly to a point slightly above the normal level of the glass in the tank and thence downwardly to the discharge outlet, and an air conduit leading from the outer end of said member horizontally to the inner portion of said glass conduit, and means for introducing air under pressure in said air conduit.

2. Discharge means for a glass tank, including a discharge member adapted to extend through the wall of the tank and beyond the inner and outer surfaces thereof and having a glass conduit leading from the inner end of the discharge member horizontally near one side of said member to the outer end and at the outer end being elevated to a point above the normal level of the glass in the tank and thence extending downwardly to the discharge end thereof, and an air conduit in the other side of said member leading from the upper surface of the outer end thereof downwardly and horizontally toward the inner end of said member and thence transversely to the inner end of the horizontal portion of the glass conduit, and means mounted on the outer end of the discharge member for supplying air under pressure to said air conduit.

3. Discharge means for a glass tank, including a discharge member adapted to extend through the wall of the glass tank and beyond the inner and outer surfaces thereof, and having a glass conduit leading from the bottom of the inner end of said member upwardly and thence horizontally to the outer end of said member and thence upwardly to a point slightly above the normal level of the glass in the tank and thence downwardly to the discharge outlet, and an air conduit leading from the outer end of said member horizontally to the inner end of said glass conduit, and means mounted on the outer end of said member for supplying air to said air conduit, the lower end of said air supply means being on a higher level than the normal level of glass in the tank.

In witness whereof, I have hereunto affixed my signature.

EDWARD S. HUTTON.